US008583349B2

(12) United States Patent
Anilovich et al.

(10) Patent No.: US 8,583,349 B2
(45) Date of Patent: Nov. 12, 2013

(54) SYSTEMS AND METHODS FOR DIAGNOSING OXYGEN SENSORS AND CATALYTIC CONVERTERS OF EXHAUST SYSTEMS

(75) Inventors: Igor Anilovich, Walled Lake, MI (US);
John W. Siekkinen, Novi, MI (US);
Wesley W. Wald, Linden, MI (US);
Robert J. Genslak, Macomb, MI (US);
Jeffry A. Helmick, Oxford, MI (US);
John F. Van Gilder, Webberville, MI (US)

(73) Assignee: GM Global Technology Operations LLC

( * ) Notice: Subject to any disclaimer, the term of this patent is extended or adjusted under 35 U.S.C. 154(b) by 874 days.

(21) Appl. No.: 12/612,878

(22) Filed: Nov. 5, 2009

(65) Prior Publication Data

US 2011/0106411 A1    May 5, 2011

(51) Int. Cl.
*F02D 41/00* (2006.01)
*F01N 11/00* (2006.01)
*G01M 15/10* (2006.01)

(52) U.S. Cl.
USPC .............................. 701/109; 701/114; 60/277

(58) Field of Classification Search
USPC .................... 701/102–105, 109, 114; 60/277
See application file for complete search history.

(56) References Cited

U.S. PATENT DOCUMENTS

| 5,640,847 | A  | * | 6/1997  | Nakajima et al. ............... 60/276 |
| 5,970,967 | A  |   | 10/1999 | Uchikawa |
| 6,874,313 | B2 |   | 4/2005  | Yurgil et al. |
| 6,915,628 | B2 | * | 7/2005  | Kamoto et al. ................. 60/277 |
| 6,957,562 | B2 |   | 10/2005 | Anilovich et al. |
| 7,100,364 | B2 | * | 9/2006  | Harrison et al. ................ 60/285 |
| 7,444,235 | B2 |   | 10/2008 | Anilovich et al. |
| 7,769,534 | B1 |   | 8/2010  | Xu et al. |
| 7,793,489 | B2 | * | 9/2010  | Wang et al. ..................... 60/276 |
| 7,881,859 | B2 |   | 2/2011  | Moening et al. |
| 7,900,439 | B2 | * | 3/2011  | Genslak et al. ................. 60/277 |
| 8,086,392 | B2 |   | 12/2011 | Anilovich et al. |
| 8,190,352 | B2 | * | 5/2012  | Brandt et al. ................. 701/114 |

(Continued)

FOREIGN PATENT DOCUMENTS

| DE | 10331334 | 2/2005 |
| DE | 102006047188 | 4/2008 |
| DE | 102008026859 | 1/2009 |

OTHER PUBLICATIONS

Office Action dated Aug. 21, 2012 from the German Patent Office for German Patent Application No. 10 2010 050 060.7, 7 pages.

*Primary Examiner* — Stephen K Cronin
*Assistant Examiner* — Arnold Castro

(57) ABSTRACT

A diagnostic system for an engine includes a stage transition module and a control module. The stage transition module generates a command signal based on a fuel control signal. The command signal commands a fuel system of the engine to intrusively transition between rich and lean states during a diagnostic test that includes first, second, and third stages. The first, second, and third stages are defined based on transitions between the rich and lean states. The control module during the second and third stages detects: an error with a first oxygen sensor based on a comparison between the command signal and a first oxygen signal from the first oxygen sensor; an error with a second oxygen sensor based on a second oxygen signal from the second oxygen sensor; and an error with a catalytic converter based on the first and second oxygen signals and a manifold absolute pressure signal.

19 Claims, 9 Drawing Sheets

(56) References Cited

U.S. PATENT DOCUMENTS

| | | | |
|---|---|---|---|
| 8,196,460 B2* | 6/2012 | Barnikow et al. | 73/114.69 |
| 2005/0075781 A1* | 4/2005 | Mizuno et al. | 701/109 |
| 2006/0154784 A1* | 7/2006 | Surnilla et al. | 477/111 |
| 2006/0260295 A1* | 11/2006 | Gielen | 60/285 |
| 2006/0282211 A1* | 12/2006 | Yasui | 701/103 |
| 2008/0115486 A1* | 5/2008 | Yurgil | 60/277 |
| 2011/0082635 A1* | 4/2011 | Midlam-Mohler et al. | 701/104 |
| 2012/0253643 A1* | 10/2012 | Nakamura et al. | 701/104 |

\* cited by examiner

SYSTEMS AND METHODS FOR DIAGNOSING OXYGEN SENSORS AND CATALYTIC CONVERTERS OF EXHAUST SYSTEMS

FIELD

The present application relates to vehicle diagnostic systems, and more particularly to intrusive diagnostic systems for oxygen sensors and catalytic converters of exhaust systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

During the combustion process of an internal combustion engine (ICE), gasoline is oxidized and hydrogen (H) and carbon (C) combine with air to produce various chemical compounds. The chemical compounds are received by an exhaust system and may include, for example, carbon dioxide ($CO_2$), water ($H_2O$), carbon monoxide (CO), nitrogen oxides ($NO_x$), unburned hydrocarbons (HC), and sulfur oxides ($SO_x$).

An exhaust system of an ICE may include a catalytic converter, a primary oxygen sensor and a secondary oxygen sensor. The catalytic converter reduces exhaust emissions by chemically converting an exhaust gas into carbon dioxide ($CO_2$), nitrogen (N), and water ($H_2O$). The primary and secondary oxygen sensors are used to detect oxygen content of the exhaust gas. The primary oxygen sensor monitors an oxygen level associated with exhaust gas entering the catalytic converter. The secondary oxygen sensor detects the oxygen level associated with exhaust gas exiting the catalytic converter. The primary and secondary oxygen sensors provide feedback signals that are used to maintain an air-to-fuel (A/F) ratio of the ICE at a chemically correct or stoichiometric A/F ratio to support catalytic conversion processes.

SUMMARY

In one embodiment, a diagnostic system is provided that includes a stage transition module and a control module. The stage transition module generates a command signal based on a fuel control signal. The command signal commands a fuel system of the engine to intrusively transition between a rich state and a lean state during a diagnostic test that includes a first stage, a second stage, and a third stage. The first, second, and third stages are defined based on transitions between the rich and lean states of the command signal. During the second and third stages, the control module detects: an error with a primary oxygen sensor based on a comparison between the command signal and a primary oxygen signal from the primary oxygen sensor; an error with a secondary oxygen sensor based on a secondary oxygen signal from the secondary oxygen sensor; and an error with a catalytic converter based on the primary and secondary oxygen signals and a manifold absolute pressure signal.

In other features, a method of diagnosing an exhaust system is provided. The method includes generating a command signal based on a fuel control signal. The command signal commands a fuel system of the engine to intrusively transition between a rich state and a lean state during a diagnostic test that includes a first stage, a second stage, and a third stage. The first, second, and third stages are defined based on transitions between the rich and lean states of the command signal. During the second and third stages, an error with a primary oxygen sensor based on a comparison between the command signal and a primary oxygen signal from the primary oxygen sensor; an error with a secondary oxygen sensor based on a secondary oxygen signal from the secondary oxygen sensor; and an error with a catalytic converter based on the primary and secondary oxygen signals and a manifold absolute pressure signal are detected.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
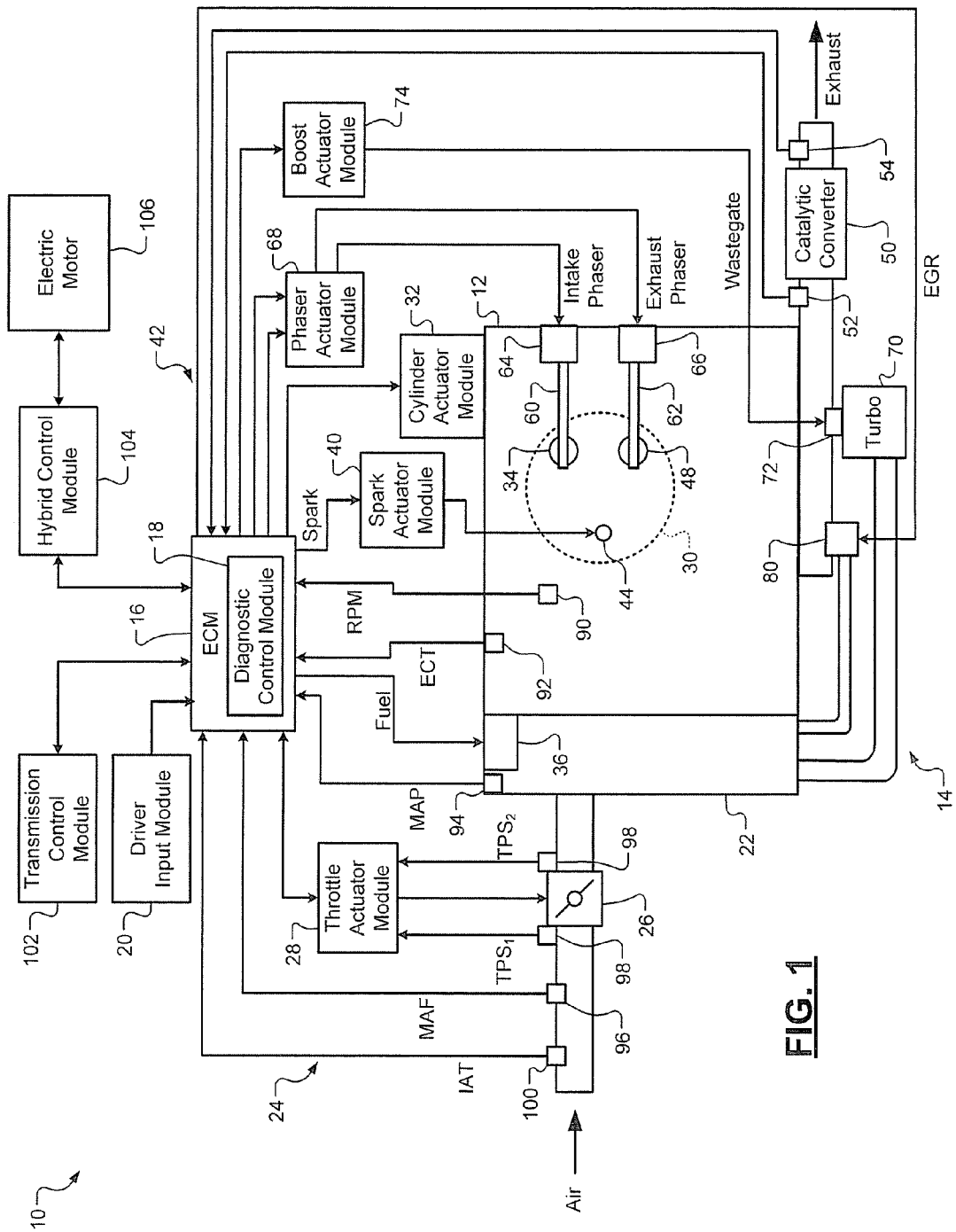
FIG. 1 is a functional block diagram of a portion of an engine control system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In addition, although the following embodiments are described primarily with respect to example internal combustion engines, the embodiments of the present disclosure may apply to other engines. For example, the present disclosure may apply to compression ignition, spark ignition, homogenous spark ignition, homogeneous charge compression ignition, stratified spark ignition, and spark assisted compression ignition engines.

An exhaust diagnostic system may monitor a catalytic converter and primary (first) and secondary (second) oxygen sensors to ensure proper operation of an ICE and an exhaust system. Three diagnostic tests may be sequentially performed to respectively diagnose each of the primary and secondary oxygen sensors and the catalytic converter. The implementation of multiple tests can increase overall diagnostic period due to the amount of data collected during performance of the three diagnostic tests.

Separate intrusive tests may be implemented to diagnose the operation of the primary and secondary oxygen sensors and the catalytic converter. During the intrusive tests, A/F ratios are intrusively adjusted and responses of the primary and secondary sensors are monitored. Although the intrusive tests allow for error detection of the primary and secondary oxygen sensors and the catalytic converter, multiple intrusive tests can increase exhaust emissions, cause engine instability, and reduce fuel economy.

The present disclosure provides techniques for diagnosing oxygen sensors and a catalytic converter of an exhaust system during engine operation. The diagnostic techniques minimize the number of intrusive tests performed, which can improve fuel economy and engine stability, and decrease exhaust emissions.

In FIG. 1, a first portion 10 of an engine control system is shown. The engine control system includes an engine 12, an exhaust system 14 and an engine control module (ECM) 16. The ECM 16 includes a diagnostic control module 18 that diagnoses errors and detects faults associated with components of the exhaust system 14.

An error may refer to, for example, a sensor signal that indicates improper operation with a corresponding sensor and/or with another component of an engine control system. An error may exist when a characteristic of the sensor signal exceeds a threshold. Sensor signal characteristics may include frequency, rich and lean state durations, amplitudes, etc. These sensor signal characteristics and others are described below.

A fault may refer to an identification of when a component is operating improperly. A component may not be faulty although an error is associated with the component. For example, a sensor signal generated by a sensor may indicate that an error is associated with that sensor. The error may be a FALSE indication of a fault with the sensor. The error may be generated due to a fault associated with other component(s).

As another example, an oxygen ($O_2$) sensor may generate an $O_2$ signal that indicates that the $O_2$ sensor is operating improperly. This may be a TRUE or FALSE indication of a fault with the $O_2$ sensor. The $O_2$ sensor may not be faulty (operating properly), for example, when a catalytic converter or other $O_2$ sensor is faulty. This is described in further detail below.

The engine 12 combusts an A/F mixture to produce drive torque for a vehicle based on a driver input module 20. While a spark ignition, gasoline type engine is described herein, the present disclosure is applicable to other types of torque producers, such as diesel engines, alternative fuel-based engines (e.g., propane and hydrogen engines), and hybrid engines.

Air is drawn into an intake manifold 22 of a throttle control system 24 of the engine 12 through a throttle valve 26. The ECM 16 commands a throttle actuator module 28 to regulate opening of the throttle valve 26 to control an amount of air drawn into the intake manifold 22. Air from the intake manifold 22 is drawn into cylinders of the engine 12. While the engine 12 may include multiple cylinders, for illustration purposes, a single representative cylinder 30 is shown. The ECM 16 may instruct a cylinder actuator module 32 to selectively deactivate some of the cylinders to improve fuel economy.

Air from the intake manifold 22 is drawn into the cylinder 30 through an intake valve 34. The ECM 16 controls the amount of fuel injected by a fuel injection system 36. The fuel injection system 36 may inject fuel into the intake manifold 22 at a central location or may inject fuel into the intake manifold 22 at multiple locations, such as near the intake valve of each of the cylinders. Alternatively, the fuel injection system 36 may inject fuel directly into the cylinders.

The injected fuel mixes with the air and creates the A/F mixture in the cylinder 30. A piston (not shown) within the cylinder 30 compresses the A/F mixture. Based upon a signal from the ECM 16, a spark actuator module 40 of an ignition system 42 energizes a spark plug 44 in the cylinder 30, which ignites the A/F mixture. The timing of the spark may be specified relative to the time when the piston is at its topmost position, referred to as top dead center (TDC). This is the point at which the A/F mixture is most compressed.

The combustion of the A/F mixture drives the piston down, thereby driving a rotating crankshaft (not shown). Byproducts of the combustion are released through an exhaust valve 48 and into the exhaust system 14. The exhaust system 14 includes a catalytic converter 50, a primary (e.g., pre-converter) $O_2$ sensor 52, and a secondary (e.g., post-converter) $O_2$ sensor 54. The primary $O_2$ sensor 52 is located upstream (with respect to the exhaust) of the catalytic converter 50 between the exhaust manifold and the catalytic converter 50. The secondary $O_2$ sensor 54 is positioned downstream of the catalytic converter 50.

The catalytic converter 50 controls emissions by increasing the rate of oxidization of hydrocarbons (HC) and carbon monoxide (CO) and by increasing the rate of reduction of nitrogen oxides ($NO_x$). To enable oxidization, the catalytic converter 50 requires $O_2$. $O_2$ storage capacity of the catalytic converter 50 is indicative of: catalytic converter efficiency in oxidizing the HC and CO; and catalytic converter ability in reducing $NO_x$.

The primary $O_2$ sensor 52 communicates with the ECM 16 and measures the $O_2$ content of the exhaust stream entering the catalytic converter 50. The secondary $O_2$ sensor 54 communicates with the ECM 16 and measures the $O_2$ content of the exhaust stream exiting the catalytic converter 50. The primary and secondary $O_2$ signals are indicative of $O_2$ levels in the exhaust system 14 before and after the catalytic converter 50. The $O_2$ sensors 52, 54 generate respective primary and secondary $O_2$ signals that are feedback to the ECM 16 for closed loop control of A/F ratio(s).

In one embodiment, the primary and secondary $O_2$ signals are weighted and a commanded A/F ratio is generated based, for example, 80% on the primary $O_2$ signal and 20% on the secondary $O_2$ signal. In another embodiment, the secondary $O_2$ signal is used to adjust a commanded A/F ratio that is generated based on the primary $O_2$ signal. The primary $O_2$ signal may be used for rough adjustment of an A/F ratio and the secondary $O_2$ signal may be used for fine adjustment of the A/F ratio. The ECM 16 adjusts fuel flow, throttle positioning, and spark timing based on the primary and secondary $O_2$ signals to regulate A/F ratio(s) in cylinders of the engine 12.

The diagnostic control module 18 monitors the primary and secondary $O_2$ signals and determines when there is an error and/or fault associated with the catalytic converter 50 and/or one or more of the $O_2$ sensors 52, 54. Performance diagnostics are performed on the $O_2$ sensors 52, 54 to determine whether the sensors are working properly. For example, the efficiency of catalytic converter monitoring may be decreased when one or more of the $O_2$ sensors 52, 54 are not functioning properly. The ECM 16 may compensate for the error(s) and/or fault(s) detected by the diagnostic control module 18. This compensation may be implemented when regulating the A/F ratio(s) of the engine 12.

The intake valve 34 may be controlled by an intake camshaft 60, while the exhaust valve 48 may be controlled by an exhaust camshaft 62. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 32 may deactivate cylinders by halting provision of fuel and spark and/or disabling their exhaust and/or intake valves.

The time at which the intake valve 34 is opened may be varied with respect to piston TDC by an intake cam phaser 64. The time at which the exhaust valve 48 is opened may be varied with respect to piston TDC by an exhaust cam phaser 66. A phaser actuator module 68 controls the phasers 64, 66 based on signals from the ECM 16.

The engine control system may include a boost device that provides pressurized air to the intake manifold 22. For example, FIG. 1 depicts a turbocharger 70. The turbocharger 70 is powered by exhaust gases flowing through the exhaust system 14, and provides a compressed air charge to the intake manifold 22. The air used to produce the compressed air charge may be taken from the intake manifold 22.

A wastegate 72 may allow exhaust gas to bypass the turbocharger 70, thereby reducing the turbocharger's output (or boost). The ECM 16 controls the turbocharger 70 via a boost actuator module 74. The boost actuator module 74 may modulate the boost of the turbocharger 70 by controlling the position of the wastegate 72. The compressed air charge is provided to the intake manifold 22 by the turbocharger 70. An intercooler (not shown) may dissipate some of the compressed air charge's heat, which is generated when air is compressed and may also be increased by proximity to the exhaust system 14. Alternate engine systems may include a supercharger that provides compressed air to the intake manifold 22 and is driven by the crankshaft.

The engine control system may include an exhaust gas recirculation (EGR) valve 80, which selectively redirects exhaust gas back to the intake manifold 22. In various implementations, the EGR valve 80 may be located after the turbocharger 70. The engine control system may measure the speed of the crankshaft in revolutions per minute (RPM) using an RPM sensor 90. The temperature of the engine coolant may be measured using an engine coolant temperature (ECT) sensor 92. The ECT sensor 92 may be located within the engine 12 or at other locations where the coolant is circulated, such as a radiator (not shown).

The pressure within the intake manifold 22 may be measured using a manifold absolute pressure (MAP) sensor 94. In various implementations, engine vacuum may be measured, where engine vacuum is the difference between ambient air pressure and the pressure within the intake manifold 22. The mass of air flowing into the intake manifold 22 may be measured using a mass air flow (MAF) sensor 96. The MAF sensor 96 generates a MAF signal that indicates a rate of air flowing through the MAF sensor 96. In various implementations, the MAF sensor 96 may be located in a housing with the throttle valve 26.

The throttle actuator module 28 may monitor the position of the throttle valve 26 using one or more throttle position sensors (TPS) 98. The ambient temperature of air being drawn into the engine control system may be measured using an intake air temperature (IAT) sensor 100. The ECM 16 may use signals from the sensors to make control decisions for the engine control system.

The ECM 16 may communicate with a transmission control module 102 to coordinate shifting gears in a transmission (not shown). For example, the ECM 16 may reduce torque during a gear shift. The ECM 16 may communicate with a hybrid control module 104 to coordinate operation of the engine 12 and an electric motor 106. The electric motor 106 may also function as a generator, and may be used to produce electrical energy for use by vehicle electrical systems and/or for storage in a battery. In various implementations, the ECM 16, the transmission control module 102, and the hybrid control module 104 may be integrated into one or more modules.

To abstractly refer to the various control mechanisms of the engine 12, each system that varies an engine parameter may be referred to as an actuator. For example, the throttle actuator module 28 can change the blade position, and therefore the opening area, of the throttle valve 26. The throttle actuator module 28 can therefore be referred to as an actuator, and the throttle opening area can be referred to as an actuator position.

Similarly, the spark actuator module 40 can be referred to as an actuator, while the corresponding actuator position is amount of spark advance. Other actuators include the boost actuator module 74, the EGR valve 80, the phaser actuator module 68, the fuel injection system 36, and the cylinder actuator module 32. The term actuator position with respect to these actuators may correspond to boost pressure, EGR valve opening, intake and exhaust cam phaser angles, A/F ratio, and number of cylinders activated, respectively.

Figure 2:
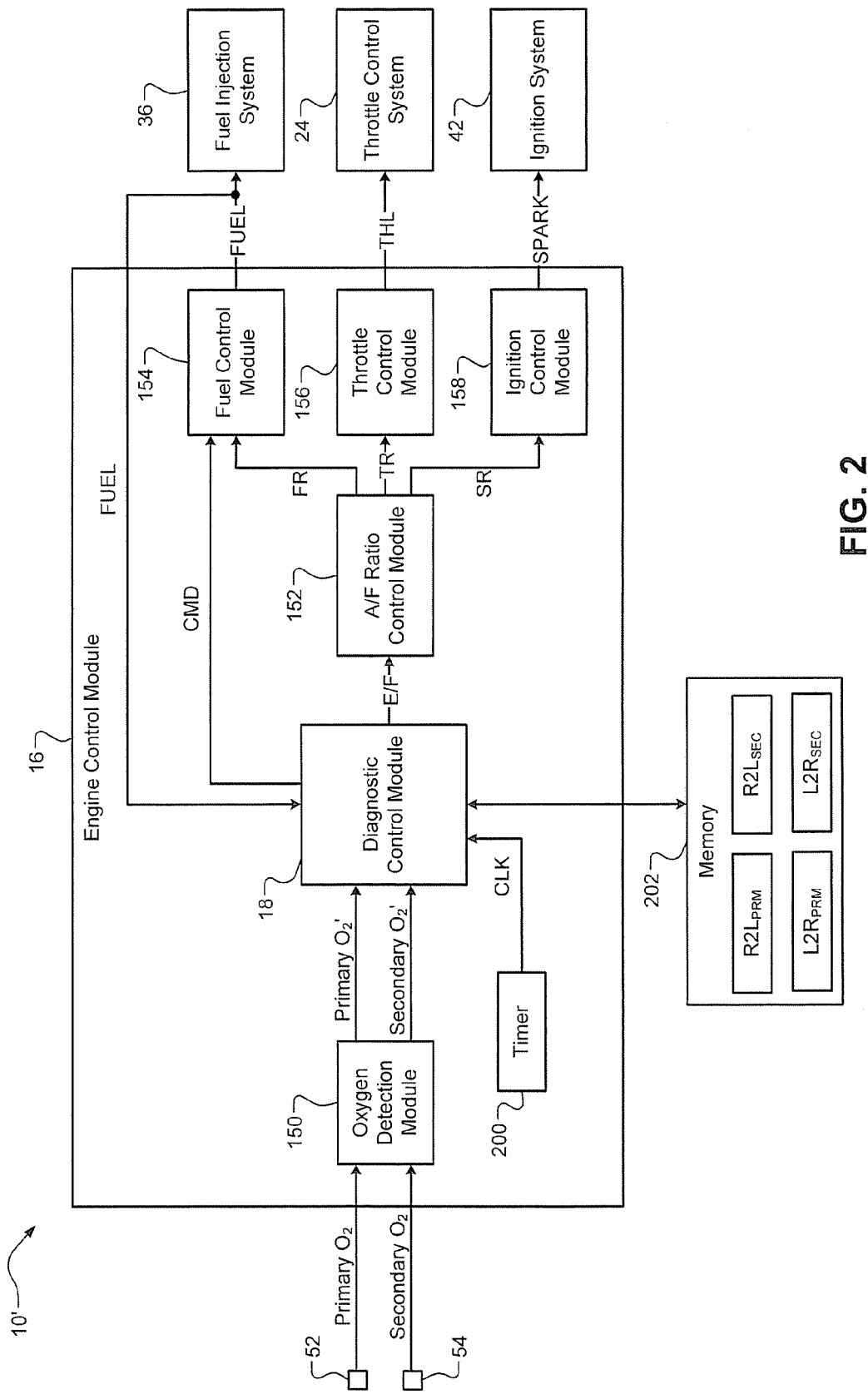
FIG. 2 is a functional block diagram of another portion of the engine control system of FIG. 1 in accordance with an embodiment of the present disclosure.

In FIG. 2, a second portion 10' of the engine control system is shown. The second portion 10' includes the ECM 16, the throttle control system 24, the fuel injection system 36, and the ignition system 42. The ECM 16 includes an oxygen detection module 150, the diagnostic control module 18, and an A/F ratio control module 152.

In operation, the oxygen detection module 150 receives primary and secondary $O_2$ signals Primary $O_2$ and Secondary $O_2$ from the $O_2$ sensors 52, 54. The oxygen detection module 150 may provide signal conditioning and filter the $O_2$ signals Primary $O_2$ and Secondary $O_2$ to generate conditioned primary and secondary $O_2$ signals Primary $O_2$' and Secondary $O_2$'.

The diagnostic control module 18 generates error and/or fault signals E/F based on the conditioned primary and secondary $O_2$ signals. The A/F ratio control module 152 generates a requested fuel signal FR, a requested throttle position signal TR, and a requested spark signal SR. The signals FR, TR and SR are generated based on the error and fault signals E/F and are received respectively by a fuel control module 154, a throttle control module 156, and an ignition control module 158. The requested signals are generated to adjust the A/F ratio(s) of the engine 12. The A/F ratio(s) may be adjusted to be at or centered about predetermined and/or stoichiometric values (e.g., A/F ratio 14.7:1).

The fuel control module 154 generates a fuel control signal FUEL based on the requested fuel signal FR. The throttle control module 156 generates a throttle control signal THL based on the requested throttle position signal TR. The ignition control module 158 generates an ignition control signal SPARK based on the requested spark signal SR. The signals FUEL, THL and SPARK may respectively include fuel amounts, injector timing values, injector opening values, injector ON times and durations, throttle positions, spark timing values, etc.

Due to closed loop control of the A/F ratio(s), the $O_2$ signals Primary $O_2$ and Secondary $O_2$ may exhibit oscillating characteristics. For example, the primary $O_2$ signal Primary $O_2$ may oscillate between rich and lean states when the primary $O_2$ sensor is operating in a normal state (i.e., without errors). An $O_2$ signal may have a sine, square or other periodic and oscillating waveform. A rich state may refer to when an A/F ratio is less than a predetermined and/or stoichiometric value (e.g., 14.7:1). A lean state may refer to when an A/F ratio is greater than the predetermined and/or stoichiometric value (e.g., 14.7:1).

The $O_2$ signals may be indicative of the rich and lean states, which correspond to an amount of oxygen in an exhaust gas. For example, oxygen content levels greater than a first predetermined level may indicate that the A/F ratio is lean or greater than a desired value (e.g., a stoichiometric value). In contrast, oxygen content levels less than a second predetermined level may indicate that the A/F ratio is rich or less than the desired value.

Transitions between the rich and lean states may be detected by the $O_2$ sensors 52, 54. The $O_2$ sensors 52, 54 may respond to the transitions (e.g., rich-to-lean or lean-to-rich) by oscillating the $O_2$ signals between the rich and lean states. Response time for the $O_2$ sensors 52, 54 to indicate one of the transitions may increase as the $O_2$ sensors 52, 54 become deteriorated or damaged. For example, a fault of an $O_2$ sensor may be detected by measuring a time difference (time delay) between a first rich-to-lean transition of the A/F ratio and a second rich-to-lean transition of the $O_2$ signal that sequentially follows the first rich-to-lean transition.

The time delay between the first and second rich-to-lean transitions may indicate whether an $O_2$ sensor is operating in a normal state or an error state. For example, an $O_2$ sensor may be operating in a normal state when the time delay is less than a predetermined period. In contrast, a malfunctioning $O_2$ sensor may exhibit an increased amount of time delay that is greater than or equal to the predetermined period.

The diagnostic control module 18 may monitor and store time delay values associated with the $O_2$ signals Primary $O_2'$ and Secondary $O_2'$ during transitions between the rich and lean states. The time delay values refer to durations associated with the $O_2$ sensors 52, 54 transitioning between the rich and lean states. The time delay values may be calculated based on a clock signal CLK from a timer 200 and stored in memory 202. The time delay values during a rich-to-lean transition $R2L_{PRM}$ and during a lean-to-rich transition $L2R_{PRM}$ for the primary $O_2$ sensor 52 are shown. The time delays during a rich-to-lean transition $R2L_{SEC}$ and during a lean-to-rich transition $L2R_{SEC}$ for the secondary $O_2$ sensor 54 are also shown. The time delay values may be compared with predetermined thresholds to diagnose the $O_2$ sensors 52, 54.

Figure 3:
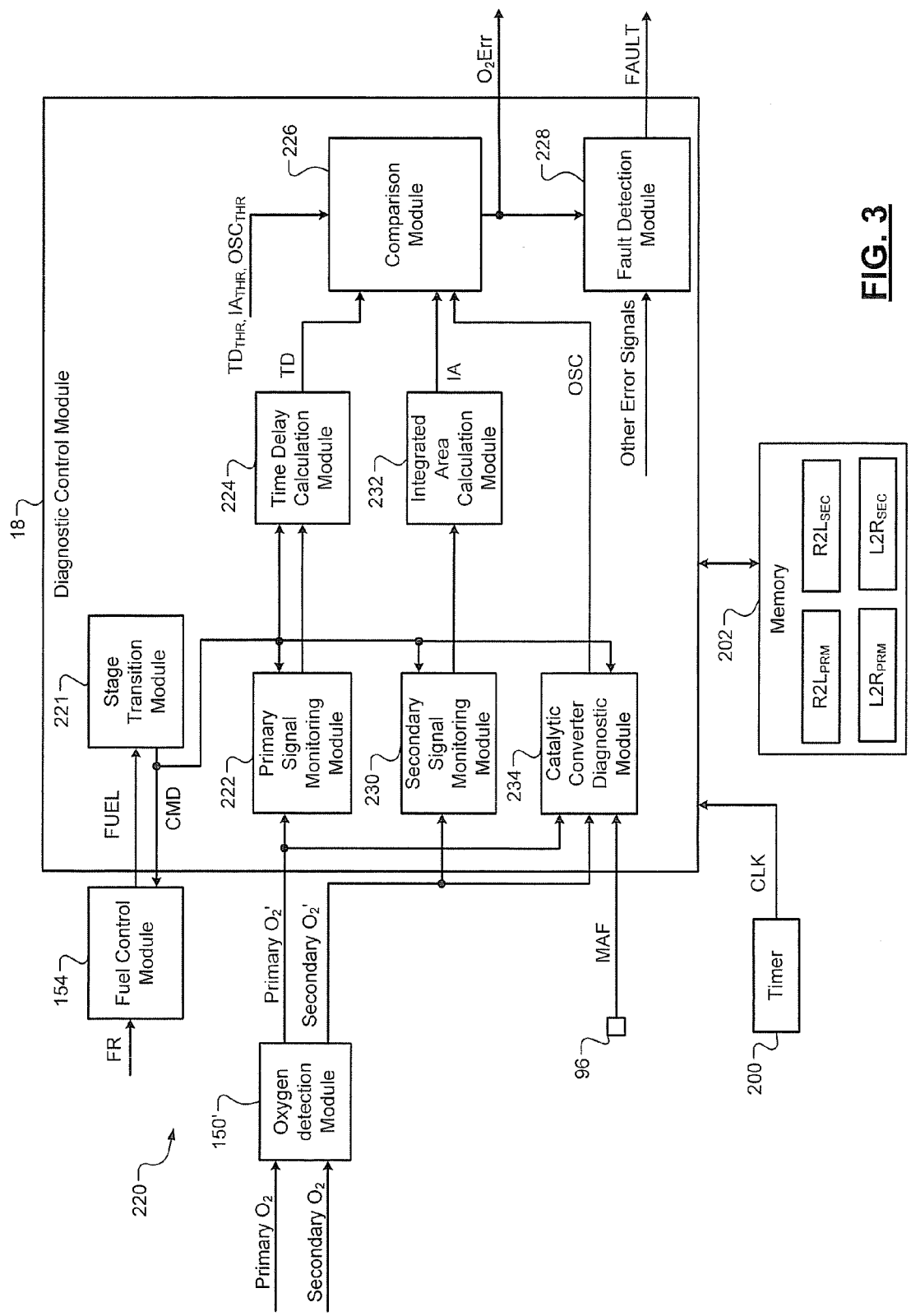
FIG. 3 is a functional block diagram of a diagnostic system in accordance with an embodiment of the present disclosure.

In FIG. 3, an exemplary diagnostic system 220 is shown. The diagnostic system 220 diagnoses the $O_2$ sensors 52, 54 and the catalytic converter 50 of the exhaust system 14 of FIG. 1. The diagnostic system 220 includes the diagnostic control module 18 and an oxygen detection module 150'. The diagnostic control module 18 may include a stage transition module 221, a primary signal monitoring module 222, a time delay calculation module 224, a comparison module 226, a fault detection module 228, a secondary signal monitoring module 230, an integrated area (IA) calculation module 232, and a catalytic converter diagnostic module 234.

The diagnostic control module 18 may operate in an intrusive mode and detect error(s) and/or fault(s) associated with one or more $O_2$ sensor(s) and a catalytic converter. The intrusive mode refers to the detection of error(s) and/or fault(s) with intrusive control of fuel, throttle, and ignition control systems. During the intrusive mode, the diagnostic control module 18 detects the error(s) and/or fault(s) based on $O_2$ signals generated by the $O_2$ sensor(s).

Figure 4:
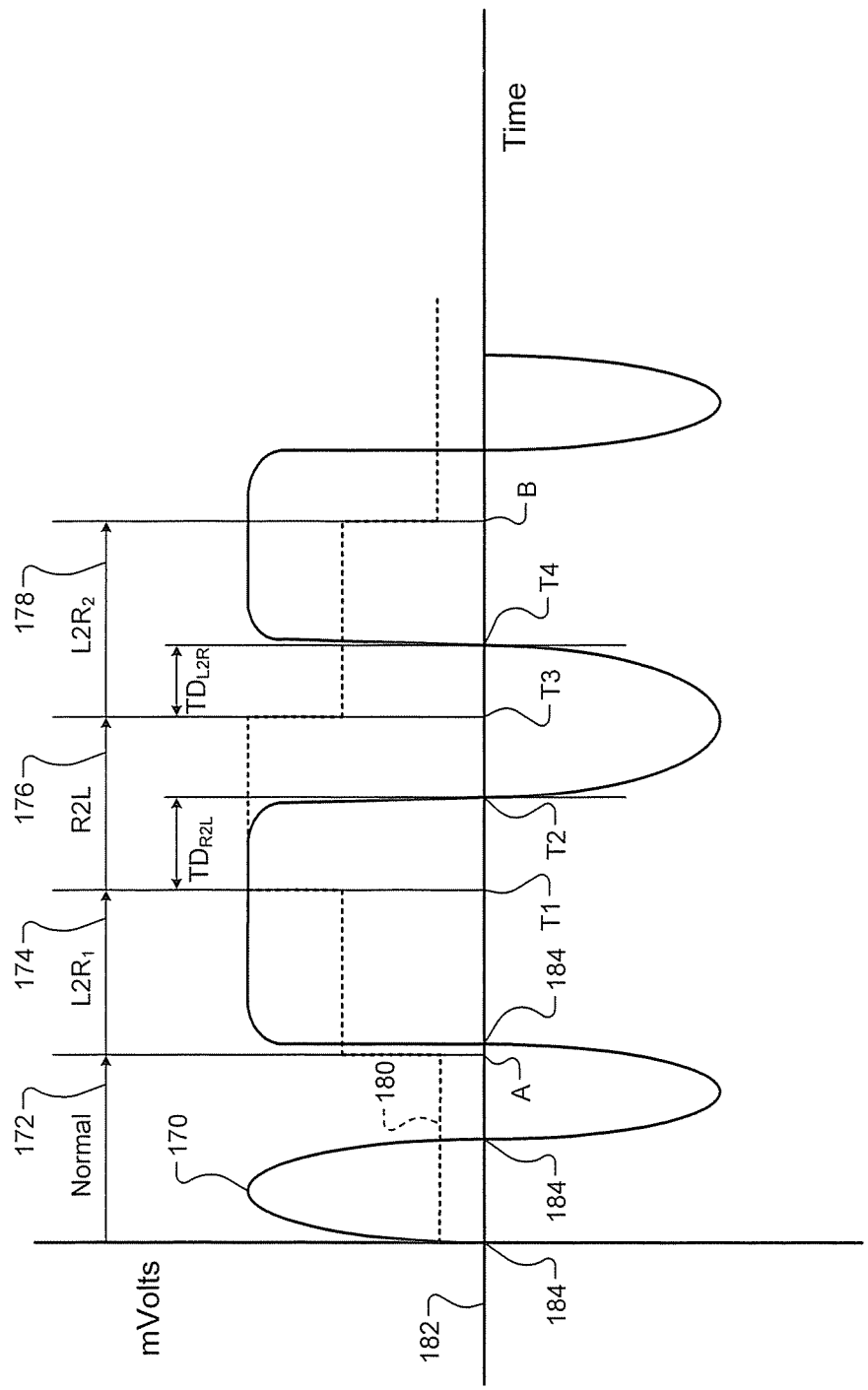
FIG. 4 is an exemplary plot of a command signal and a primary oxygen signal.

In FIG. 4, an exemplary $O_2$ signal 170 is shown. The $O_2$ signal 170 may be generated by one of the $O_2$ sensors 52, 54 when operating in a normal or baseline state (e.g., operation of the $O_2$ sensor associated with the $O_2$ signal when the $O_2$ sensor is new). The $O_2$ signal 170 has a periodic and oscillating profile that alternates between rich and lean states (designated 172). Although the $O_2$ signal 170 is in a rich state when above a horizontal axis 182 and is in a lean state when below the horizontal axis 182, the $O_2$ signal may be offset or shifted up or down relative to the horizontal axis 182. The horizontal axis 182 may correspond to, for example, a 450 mV output of an $O_2$ sensor having a stoichiometric A/F ratio. Detection of rich and lean states may be based on when: the $O_2$ signal 170 crosses the horizontal axis 182, the $O_2$ signal 170 exceeds a predetermined level; and/or inflection points of the $O_2$ signal 170. Example inflection points between rich and lean states are designated 184.

Referring again to FIG. 3, the diagnostic control module 18 may perform a diagnostic test of components of the exhaust system 14, such as the catalytic converter 50, the primary $O_2$ sensor 52, and the secondary $O_2$ sensor 54. The diagnostic test may include a first lean-to-rich stage (first stage), a rich-to-lean stage (second stage), and a second lean-to-rich stage (third stage). Each of the first, second, and third stages refers to a duration during which one of the rich and lean states is maintained for a predetermined period.

For example, the first stage refers to a duration during which the rich state is maintained by a command signal CMD for a predetermined period. The stage transition module 221 may generate the command signal CMD based on the fuel control signal FUEL. The command signal CMD commands the fuel control module 154 to transition from a lean state to a rich state for the predetermined period.

The first stage may indicate an initial lean-to-rich transition of the fuel injection system 36 that maintains the rich state for the first predetermined period. The second stage may indicate a rich-to-lean transition of the fuel injection system 36 that maintains the lean state for a second predetermined period. The third stage may indicate a lean-to-rich transition of the fuel injection system 36 that maintains the rich state for a third predetermined period.

The components of the exhaust system 14 may be diagnosed during the second and third stages. For example, during the second and third stages, the primary $O_2$ sensor 52 may be diagnosed based on the conditioned primary $O_2$ signal Primary $O_2'$. The primary signal monitoring module 222 may monitor signal transitions between the rich and lean states of the conditioned primary $O_2$ signal Primary $O_2'$. Response time for the primary $O_2$ sensor 52 to indicate one of the transitions may be measured based on the command signal CMD and the conditioned primary $O_2$ signal Primary $O_2'$.

For example, the response time may be calculated by measuring a time difference (time delay) between a first rich-to-lean transition and a second rich-to-lean transition. The first rich-to-lean transition corresponds to when the command signal CMD transitions from the rich state to the lean state. The second rich-to-lean transition corresponds to when the conditioned primary $O_2$ signal Primary $O_2$' transitions from the rich state to the lean state and sequentially follows the first rich-to-lean transition. An error may be detected when the time delay is greater than a predetermined threshold.

An $O_2$ sensor may operate in a symmetrical error state or an asymmetrical error state. A symmetrical error state refers to when errors of the $O_2$ sensor are detected during the second and third stages. An asymmetrical error state refers to when an error of the $O_2$ sensor is detected during one of the second and third stages and not during the other one of the second and third stages. The rich and lean states of the O2 signal 170 may be monitored for one or more cycles. A cycle includes consecutive rich and lean states (e.g., a rich state followed by a lean state or a lean state followed by a rich state). A cycle may be associated with three consecutive inflection points.

The time delay calculation module 224 may calculate a time delay value TD based on the command signal CMD and the conditioned primary $O_2$ signal Primary $O_2$'. The comparison module 226 may compare the time delay value TD with a predetermined threshold $TD_{THR}$ and generate an error signal $O_2$Err based on the comparison. The fault detection module 228 may receive the error signal $O_2$Err and generate a fault detection signal FAULT that indicates a PASS/FAIL status of the $O_2$ sensor associated with the error signal $O_2$Err.

The secondary $O_2$ sensor 54 may be diagnosed based on the conditioned secondary $O_2$ signal Secondary $O_2$' during the second and third stages. The secondary signal monitoring module 230 may monitor signal transitions between the rich and lean states of the conditioned secondary $O_2$ signal Secondary $O_2$'. A fault may be detected based on an integrated area (IA) defined by the secondary $O_2$ sensor's voltage signals during a transition between the rich and lean states. Examples of the IA are described below in FIG. 6.

The catalytic converter 50 may be diagnosed based on the conditioned primary and secondary $O_2$ signals Primary $O_2$', Secondary $O_2$' and a MAF signal during the second and third stages. For example, the primary and secondary $O_2$ signals Primary $O_2$', Secondary $O_2$' may be monitored during the second and third stages to estimate an oxygen storage capacity (OSC) of the catalytic converter 50. OSC refers to an ability of a catalytic converter to store excess oxygen under lean conditions and to release oxygen under rich conditions.

In operation, the catalytic converter 50 absorbs excess oxygen from an exhaust stream to allow nitrogen oxide conversion and releases oxygen to an oxygen deficient exhaust stream for hydrocarbon and carbon monoxide conversion. This is referred to as a conversion capability of the catalytic converter 50. The amounts of oxygen storage and/or release decrease as the conversion capability of the catalytic converter 50 is reduced. A reduction in OSC is related to a reduction in the conversion capability.

The catalytic converter diagnostic module 234 may perform an OSC estimation, for example, during the second and/or third stages. The OSC estimation may be performed based on the conditioned primary and secondary $O_2$ signals Primary $O_2$', Secondary $O_2$' and the MAF signal. The comparison module 226 compares the OSC value to a predetermined threshold $OSC_{THR}$ to diagnose the conversion capability of the catalytic converter 50. A fault may be detected when the OSC value is lower than the predetermined threshold $OSC_{THR}$. Examples of how to calculate an OSC value of a catalytic converter is disclosed in U.S. Pat. No. 6,874,313, issued on Apr. 5, 2005.

In FIGS. 5A-5D, a logic flow diagram illustrating a method of operating a diagnostic control system is shown. Although the following steps are primarily described with respect to the embodiments of FIGS. 1-3, the steps may be easily modified to apply to other embodiments of the present disclosure. The method may begin at step 400 of FIG. 5A.

In step 402, the oxygen detection module 150' receives $O_2$ signals Primary $O_2$, Secondary $O_2$ from the $O_2$ sensors 52, 54. The oxygen detection module 150' signal conditions the $O_2$ signals Primary $O_2$, Secondary $O_2$ to generate conditioned $O_2$ signals Primary $O_2$', Secondary $O_2$'. In step 404, the stage transition module 221 generates a command signal CMD based on a fuel control signal FUEL.

In step 406, the command signal CMD commands the fuel control module 154 to initially transition from a lean state to a rich state for a first predetermined period (i.e., first stage). In step 408, the stage transition module 221 generates the command signal CMD that commands the fuel control module 154 to transition from the rich state to the lean state for a second predetermined period (i.e., second stage).

For example, in FIG. 4, points A and B respectively refer to start and end times of a diagnostic test. The diagnostic test may include a first lean-to-rich stage (first stage), a rich-to-lean stage (second stage), and a second lean-to-rich stage (third stage). The command signal CMD (designated 180) may transition from the lean state to the rich state at point A for a predetermined period A-T1.

Points A and T1 respectively refer to start and end times of the first stage $L2R_1$ (designated 174). Points T1 and T3 respectively refer to start and end times of the second stage R2L (designated 176). Points T3 and B respectively refer to start and end times of the third stage $L2R_2$ (designated 178). Periods A-T1, T1-T3, and T3-B may be calibrated periods that are stored in the memory 202. For example only, the command signal CMD (designated 180) transitions from the rich state to the lean state at point T1 and maintains the lean state until point T3.

Referring again to FIG. 5A, components of the exhaust system 14 may be diagnosed during the second and third stages using a single intrusive test. For example, the intrusive test may include a primary $O_2$ sensor diagnostic test 410, a secondary $O_2$ sensor diagnostic test 412, and a catalytic converter diagnostic test 414. The diagnostic test 410 may detect a fault of the primary $O_2$ sensor 52 based on the command signal CMD and the conditioned primary $O_2$ signal Primary $O_2$'. The diagnostic test 412 may detect a fault of the secondary $O_2$ sensor 54 based on the command signal CMD and the conditioned secondary $O_2$ signal Secondary $O_2$'. The diagnostic test 414 may detect a fault of the catalytic converter 50 based on the command signal CMD, the conditioned primary and secondary $O_2$ signals Primary $O_2$', Secondary $O_2$' and the MAF signal. The diagnostic tests 410, 412, 414 may start at the same time.

Figure 5A:
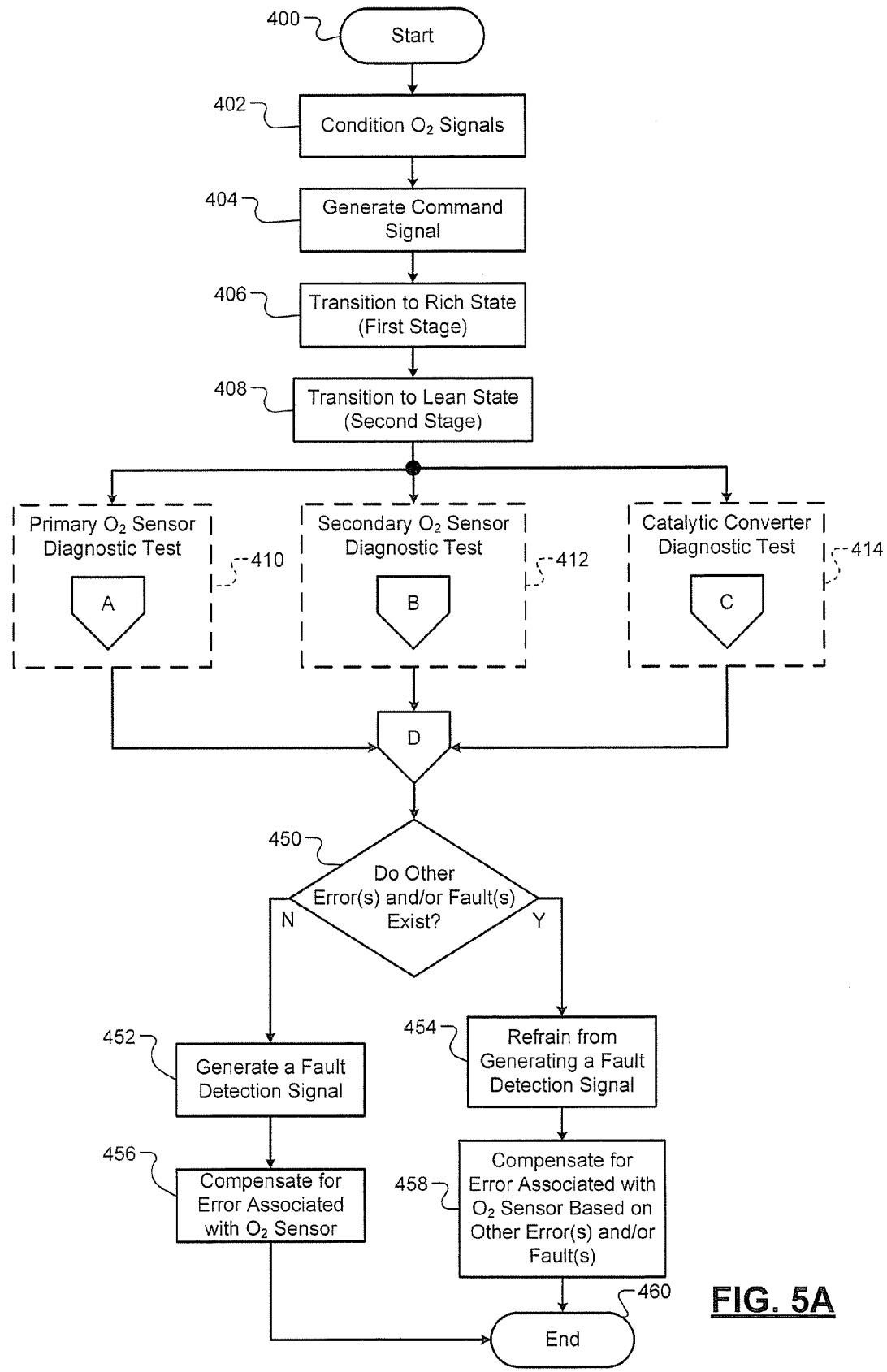
FIG. 5A is a logic flow diagram illustrating a method of operating a diagnostic system in accordance with an embodiment of the present disclosure.
Figure 5B:
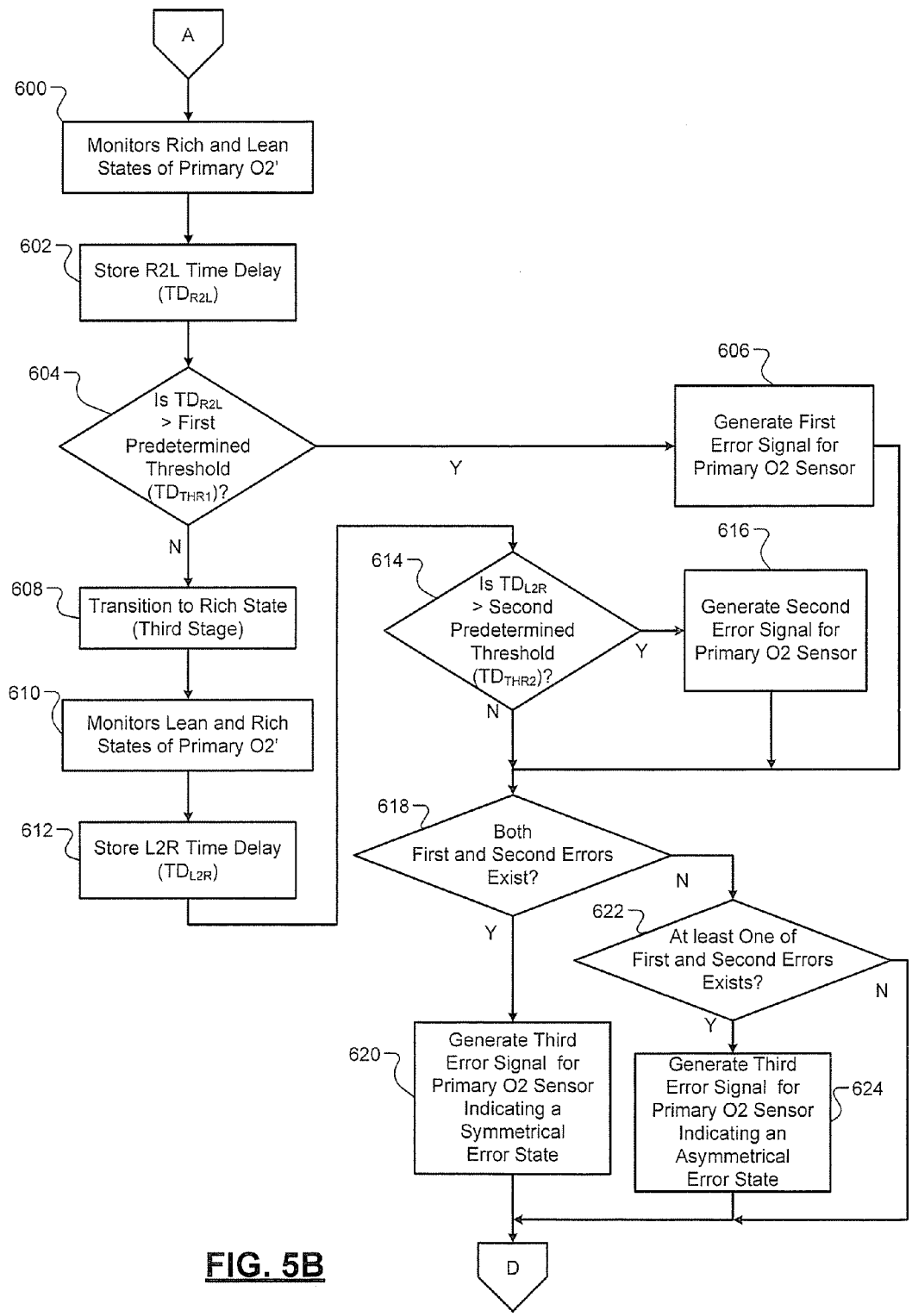
FIG. 5B illustrates a method of diagnosing a primary oxygen sensor in accordance with an embodiment of the present disclosure.

In FIG. 5B, a logic flow diagram illustrating a method of operating the primary $O_2$ sensor diagnostic test 410 is shown. In step 600, the primary signal monitoring module 222 monitors signal transitions between rich and lean states of the conditioned primary $O_2$ signal Primary $O_2$'. In step 602, the time delay calculation module 224 calculates a time delay value based on the command signal CMD and the conditioned primary $O_2$ signal Primary $O_2$'. The time delay calculation module 224 stores the time delay value in the memory 202.

For example, in FIG. 4, a rich-to-lean time delay value $TD_{R2L}$ shown between points T1-T2 refers to a time delay value during the second stage R2L. Point T1 refers to when the command signal CMD transitions from the rich state to the lean state. Point T2 refers to when the conditioned primary $O_2$ signal Primary $O_2$' transitions from rich state to the lean state. The rich-to-lean time delay value $TD_{R2L}$, for example, may be stored as a rich-to-lean time delay $R2L_{PRM}$ of FIG. 3 for the primary $O_2$ sensor 52. As another example, the richto-lean time delay $TD_{R2L}$ may be stored as a rich-to-lean time delay $R2L_{SEC}$ of FIG. 3 for the secondary $O_2$ sensor 54.

In step 604, the comparison module 226 compares the rich-to-lean time delay $TD_{R2L}$ with a first predetermined threshold $T_{DTHR1}$. The first predetermined threshold $TD_{THR1}$ may be equal to a rich-to-lean time delay of an $O_2$ sensor operating in a baseline state. The comparison module 226, for example, may proceed to step 606 when the rich-to-lean time delay $TD_{R2L}$ is greater than the first predetermined threshold $TD_{THR1}$, otherwise the comparison module 226 may proceed to step 608.

In step 606, an error may be detected when the rich-to-lean time delay $TD_{R2L}$ is greater than the first predetermined threshold $TD_{THR1}$. The comparison module 226 may generate a first error signal $O_2Err_{PRM1}$ when the rich-to-lean time delay $TD_{R2L}$ is greater than the first predetermined threshold $TD_{THR1}$. The first error signal $O_2Err_{PRM1}$ may be used to set a corresponding $O_2$ error flag (e.g., diagnostic trouble code) in memory. The first error signal $O_2Err_{PRM1}$ and/or $O_2$ error flag may be associated with and/or identify a particular $O_2$ sensor and corresponding error state of that $O_2$ sensor.

In step 608, after the second stage R2L, the stage transition module 221 generates a command signal CMD that commands the fuel control module 154 to transition from the lean state to the rich state for a third predetermined period T3-B (i.e., third stage). For example, in FIG. 4, the command signal CMD (designated 180) transitions from the lean state to the rich state at point T3 and maintains the rich state until point B.

In step 610, the primary signal monitoring module 222 monitors signal transitions between the rich and lean states of the conditioned primary $O_2$ signal Primary $O_2'$. In step 612, the time delay calculation module 224 calculates a time delay value based on the command signal CMD and the conditioned primary $O_2$ signal Primary $O_2'$. The time delay calculation module 224 stores the time delay value in the memory 202.

For example, in FIG. 4, a lean-to-rich time delay value $TD_{L2R}$ shown between points T3-T4 refers to the time delay value during the third stage $L2R_2$. Point T3 refers to when the command signal CMD transitions from the lean state to the rich state. Point T4 refers to when the conditioned primary $O_2$ signal Primary $O_2'$ transitions from the lean state to the rich state. The lean-to-rich time delay value $TD_{L2R}$, for example, may be stored as a lean-to-rich time delay value $L2R_{PRM}$ of FIG. 3 for the primary $O_2$ sensor 52. As another example, the lean-to-rich time delay value $TD_{L2R}$ may be stored as a lean-to-rich time delay value $L2R_{SEC}$ of FIG. 3 for the secondary $O_2$ sensor 54.

In step 614, the comparison module 226 compares the lean-to-rich time delay value $TD_{L2R}$ with a second predetermined threshold $TD_{THR2}$. The second predetermined threshold $TD_{THR2}$ may be equal to a lean-to-rich time delay value of an $O_2$ sensor operating in a baseline state. The comparison module 226, for example, may proceed to step 616 when the lean-to-rich time delay value $TD_{L2R}$ is greater than the second predetermined threshold $TD_{THR2}$, otherwise the comparison module 226 may proceed to step 618.

In step 616, an error may be detected when the lean-to-rich time delay $TD_{L2R}$ is greater than the second predetermined threshold $TD_{THR2}$. The comparison module 226 may generate a second error signal $O_2Err_{PRM2}$ when the lean-to-rich time delay $TD_{L2R}$ is greater than the second predetermined threshold $TD_{THR2}$. The second error signal $O_2Err_{PRM2}$ may be used to set a corresponding $O_2$ error flag (e.g., diagnostic trouble code) in memory. The second error signal $O_2Err_{PRM2}$ and/or $O_2$ error flag may be associated with and/or identify a particular $O_2$ sensor and corresponding error state of that $O_2$ sensor.

In step 618, the first and second error signals $O_2Err_{PRM1}$, $O_2Err_{PRM2}$ may be used to determine whether the primary $O_2$ sensor 52 is operating in a symmetrical error state. The primary $O_2$ sensor 52 may be operating in an asymmetrical error state when an error is detected in one of step 606 (second stage) and step 616 (third stage) and not in the other one of step 606 and step 616. In contrast, a symmetrical error state may exist when errors are detected both in step 606 and step 616. The comparison module 226 may proceed to step 620 when the primary $O_2$ sensor 52 is operating in a symmetrical error state, otherwise the comparison module 226 may proceed to step 622.

In step 620, the comparison module 226 may generate a third error signal $O_2Err_{PRM3}$ indicating that the primary $O_2$ sensor 52 is operating in a symmetrical error state. In step 622, the comparison module 226 may determine whether the primary $O_2$ sensor 52 is operating in an asymmetrical error state based on the first and second error signals $O_2Err_{PRM1}$, $O_2Err_{PRM2}$. The comparison module 226 may proceed to step 624 when an error is detected in one of step 606 and step 616, otherwise the comparison module 226 may proceed to step 450 of FIG. 5A.

In step 624, the comparison module 226 may generate a third error signal $O_2Err_{PRM3}$ indicating that the primary $O_2$ sensor 52 is operating in an asymmetrical error state. Although steps 600-624 are shown for the primary $O_2$ sensor 52, steps 600-624 may be used for the secondary $O_2$ sensor 54 and/or any other additional $O_2$ sensors.

Figure 5C:
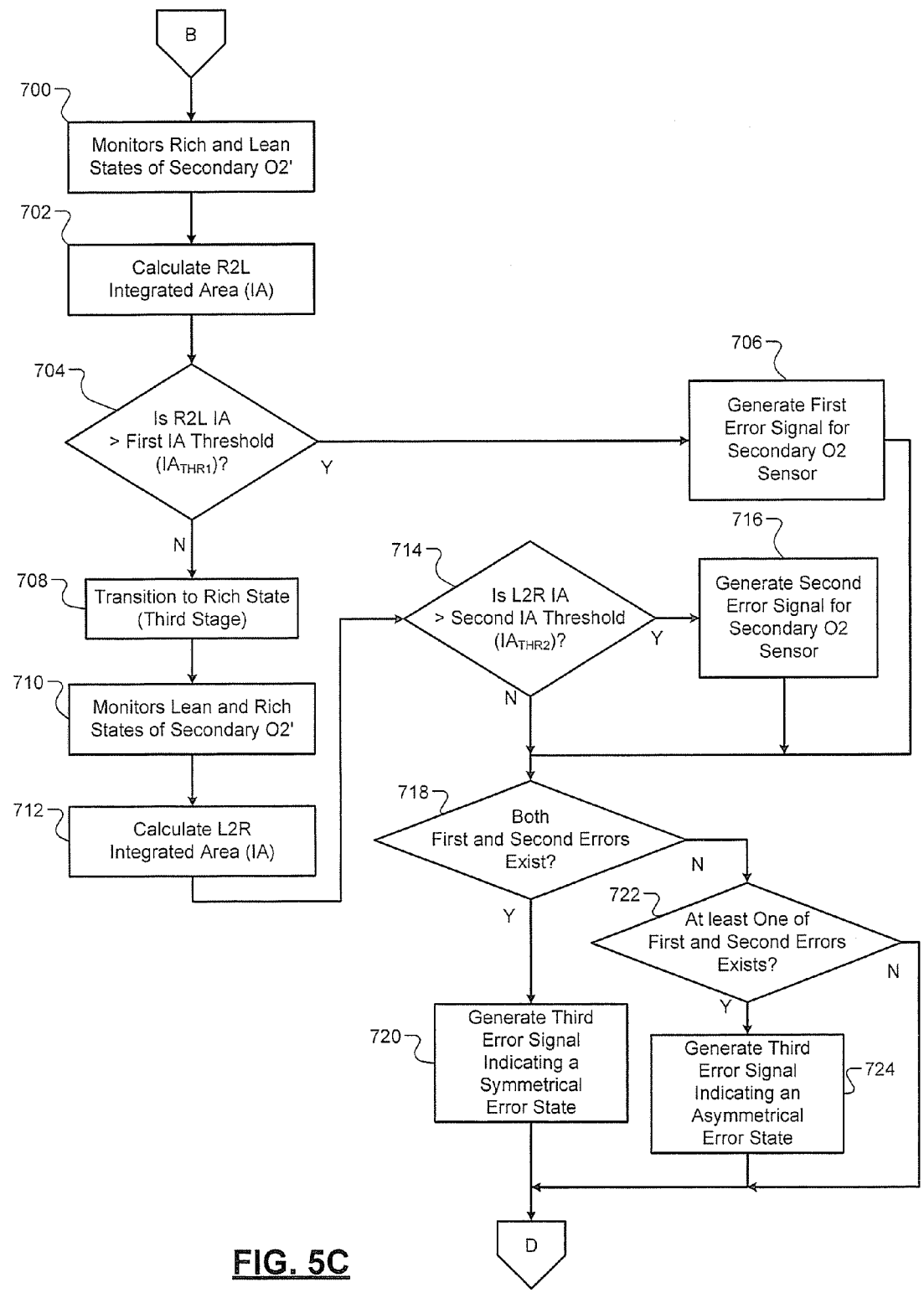
FIG. 5C illustrates a method of diagnosing a secondary oxygen sensor in accordance with an embodiment of the present disclosure.

In FIG. 5C, a logic flow diagram illustrating a method of operating the secondary $O_2$ sensor diagnostic test 412 is shown. In step 700, the secondary signal monitoring module 230 monitors signal transitions between rich and lean states of the conditioned secondary $O_2$ signal Secondary $O_2'$. The signal transitions between the rich and lean states may be used to determine an error with the secondary $O_2$ sensor 54.

Figure 6:
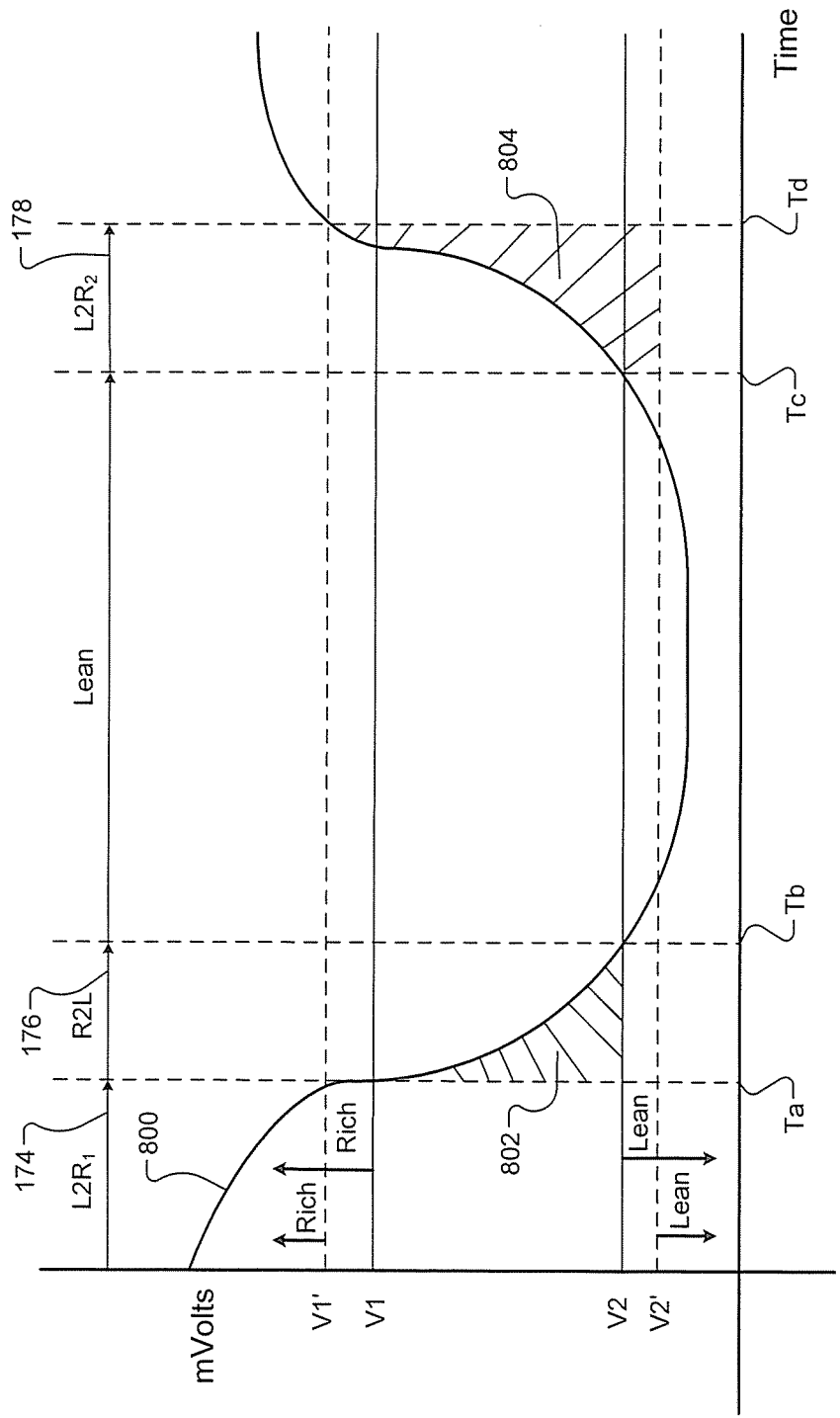
FIG. 6 is an exemplary plot of a secondary oxygen signal.

For example only, in FIG. 6, an exemplary conditioned secondary $O_2$ signal 800 is shown. Any voltage that is greater than a first output voltage V1 of the $O_2$ signal 800 may indicate a rich state. Similarly, any voltage that is less than a second output voltage V2 of the $O_2$ signal 800 may indicate a lean state.

In step 702, the IA calculation module 232 calculates a rich-to-lean IA 802 based on the $O_2$ signal 800 during the second stage R2L (designated 176). For example, the rich-to-lean IA 802 may be a shaded area that is defined as between the first and second output voltages V1, V2, and below the $O_2$ signal 800 during a period Ta-Tb. The $O_2$ signal 800 achieves the respective first and second output voltages V1, V2 during the period Ta-Tb.

The first and second output voltages V1, V2 are selected based on preliminary data analysis of the lean (e.g., during a deceleration fuel cut-off) and rich transitions for a set of combinations of the secondary $O_2$ sensor 54. As a transition speed of the $O_2$ signal 800 decreases, the rich-to-lean IA 802 increases. The rich-to-lean IA 802 is compared to a predetermined threshold $IA_{THR}$ to determine whether the signal has deteriorated such that the secondary $O_2$ sensor 54 should be serviced or replaced. Typically, the first and second output voltages V1, V2 during the second stage R2L (designated 176) and the first and second output voltages V1', V2' during the third stage $L2R_2$ (designated 178) may have different values.

In step 704, the comparison module 226 compares the rich-to-lean IA 802 with a first predetermined IA threshold $IA_{THR1}$. The first predetermined IA threshold $IA_{THR1}$ may be equal to a rich-to-lean IA of an $O_2$ sensor operating in a baseline state. The comparison module 226 may proceed to step 706 when the rich-to-lean IA 802 is greater than the first predetermined IA threshold $IA_{THR1}$, otherwise the comparison module 226 may proceed to step 708.

In step 706, an error may be detected when the rich-to-lean IA 802 is greater than the first predetermined IA threshold $IA_{THR1}$. The comparison module 226 may generate a first error signal $O_2Err_{SEC1}$ when the rich-to-lean IA 802 is greater than the first predetermined IA threshold $IA_{THR1}$. In step 708, after the second stage R2L, the stage transition module 221 generates a command signal CMD that commands the fuel control module 154 to transition from the lean state to the rich state for the third predetermined period (i.e., third stage).

In step 710, the secondary signal monitoring module 230 monitors signal transitions between the lean and rich states of the conditioned secondary $O_2$ signal Secondary $O_2'$. In step 712, the IA calculation module 232 calculates a lean-to-rich IA 804 based on the $O_2$ signal 800 during the third stage $L2R_2$ (designated 178). For example, the lean-to-rich IA 804 may be a shaded area that is defined as between the first and second output voltages V1', V2', and below the $O_2$ signal 800 during a period Tc-Td. The $O_2$ signal 800 achieves the respective first and second output voltages V1', V2' during the period Tc-Td.

In step 714, the comparison module 226 compares the lean-to-rich IA 804 with a second predetermined IA threshold $IA_{THR2}$. The second predetermined IA threshold $IA_{THR2}$ may be equal to a lean-to-rich IA of an $O_2$ sensor operating in a baseline state. The comparison module 226, for example, may proceed to step 716 when the lean-to-rich IA 804 is greater than the second predetermined IA threshold $IA_{THR2}$, otherwise the comparison module 226 may proceed to step 718.

In step 716, an error may be detected when the lean-to-rich IA 804 is greater than the second predetermined IA threshold $IA_{THR2}$. The comparison module 226 may generate a second error signal $O_2Err_{SEC2}$ when the lean-to-rich IA 804 is greater than the second predetermined IA threshold $IA_{THR2}$.

The second error signal $O_2Err_{SEC2}$ may be used to set a corresponding $O_2$ error flag (e.g., diagnostic trouble code) in memory. The second error signal $O_2Err_{SEC2}$ and/or $O_2$ error flag may be associated with and/or identify a particular $O_2$ sensor and corresponding error state of that $O_2$ sensor.

In step 718, the first and second error signals $O_2Err_{SEC1}$, $O_2Err_{SEC2}$ may be used to determine whether the secondary $O_2$ sensor 54 is operating in a symmetrical error state. The secondary $O_2$ sensor 54 may be operating in an asymmetrical error state when an error is detected in one of step 706 (second stage) and step 716 (third stage) and not in the other one of step 706 and step 716. In contrast, a symmetrical error state may exist when errors are detected both in step 706 and step 716. The comparison module 226 may proceed to step 720 when the secondary $O_2$ sensor 54 is operating in the symmetrical error state, otherwise the comparison module 226 may proceed to step 722.

In step 720, the comparison module 226 may generate a third error signal $O_2Err_{SEC3}$ indicating that the secondary $O_2$ sensor 54 is operating in the symmetrical error state. In step 722, the comparison module 226 may determine whether the secondary $O_2$ sensor 54 is operating in the asymmetrical error state based on the first and second error signals $O_2Err_{SEC1}$, $O_2Err_{SEC2}$. The comparison module 226 may proceed to step 724 when the secondary $O_2$ sensor 54 is operating in an asymmetrical error state, otherwise the comparison module 226 may proceed to step 450 of FIG. 5A.

In step 724, the comparison module 226 may generate a third error signal $O_2Err_{SEC3}$ indicating that the secondary $O_2$ sensor 54 is operating in an asymmetrical error state. Although steps 700-724 are shown for the secondary $O_2$ sensor 54, steps 700-724 may also be used for the primary $O_2$ sensor 52 and/or any other additional $O_2$ sensors.

Figure 5D:
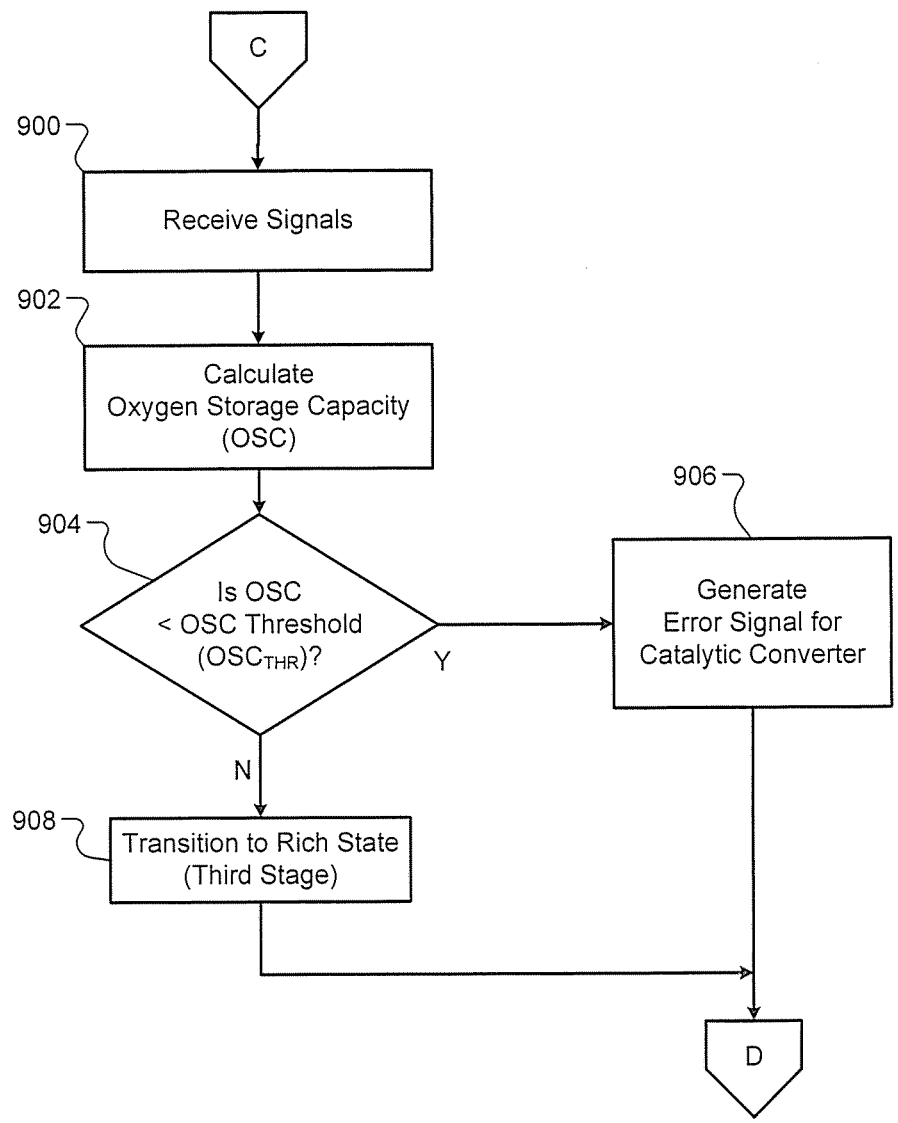
FIG. 5D illustrates a method of diagnosing a catalytic converter in accordance with an embodiment of the present disclosure.

In FIG. 5D, a logic flow diagram illustrating a method of operating the catalytic converter diagnostic test 414 is shown. In step 900, the catalytic converter diagnostic module 234 may receive the conditioned primary and secondary $O_2$ signals Primary $O_2'$, Secondary $O_2'$ and a MAF signal. In step 902, the catalytic converter diagnostic module 234 may perform an OSC estimation for the catalytic converter 50. The catalytic converter diagnostic module 234 may determine an OSC value based on the conditioned primary and secondary $O_2$ signals Primary $O_2'$, Secondary $O_2'$ and the MAF signal. Examples of how to calculate an OSC value of a catalytic converter is disclosed in U.S. Pat. No. 6,874,313, issued on Apr. 5, 2005.

In step 904, the comparison module 226 compares the OSC value to a predetermined OSC threshold $OSC_{THR}$ to diagnose a conversion capability of the catalytic converter 50. In step 906, an error may be detected when the OSC value is less than the predetermined OSC threshold $OSC_{THR}$. The comparison module 226 may generate an error signal CatalystErr when the OSC value is less than the predetermined OSC threshold $OSC_{THR}$.

In step 908, an error may not be detected when the OSC value is greater than or equal to the predetermined OSC threshold $OSC_{THR}$. After the second stage R2L, the stage transition module 221 generates a command signal CMD that commands the fuel control module 154 to transition from the lean state to the rich state for a third predetermined period (i.e., third stage). Although not shown, an additional OSC estimation may be performed during the third stage.

Referring again to FIG. 5A, in step 450, the fault detection module 228 determines whether other error(s) and/or fault(s) exist. The fault detection module 228 may, for example, proceed to step 452 when other error(s) and/or fault(s) do not exist, otherwise the fault detection module 228 may proceed to step 454.

In step 452, the fault detection module 228 generates the fault detection signal FAULT based on the error signals $O_2Err_{PRM1}$, $O_2Err_{PRM2}$, $O_2Err_{SEC1}$, $O_2Err_{SEC2}$, CatalystErr. The fault detection module 228 may generate the fault detection signal FAULT that indicates a FAIL status in one or more of the $O_2$ sensors 52, 54 associated with the error signals $O_2Err_{PRM1}$, $O_2Err_{PRM2}$, $O_2Err_{SEC1}$, $O_2Err_{SEC2}$. Similarly, the fault detection module 228 may generate the fault detection signal FAULT that indicates a FAIL status of the catalytic converter 50 associated with the error signal CatalystErr. After step 452, step 456 may be performed by, for example, the ECM 16.

In step 456, the ECM 16 generates a commanded A/F ratio while compensating for the errors associated with the error signals $O_2Err_{PRM1}$, $O_2Err_{PRM2}$, $O_2Err_{SEC1}$, $O_2Err_{SEC2}$, CatalystErr. Although not shown in FIG. 3, the fault detection module 228 may generate a fault detection signal FAULT that indicates a PASS status in one or more of the $O_2$ sensors 52, 54 and/or the catalytic converter 50 associated with the error signals $O_2Err_{PRM1}$, $O_2Err_{PRM2}$, $O_2Err_{SEc1}$, $O_2Err_{SEC2}$.

In step 454, the fault detection module 228 generates the fault detection signal FAULT' based on the error signals $O_2Err_{PRM1}$, $O_2Err_{PRM2}$, $O_2Err_{SEC1}$, $O_2Err_{SEC2}$, CatalystErr, and other error signals and/or fault signals (other set flags or diagnostic trouble codes). Example error signals are stated below. The fault detection signal FAULT' may indicate a PASS or a FAIL status in one or more of the $O_2$ sensors 52, 54 associated with the error signals $O_2Err_{PRM1}$, $O_2Err_{PRM2}$, $O_2Err_{SEC1}$, $O_2Err_{SEC2}$ and based on the error(s) and/or fault(s). After step 454, step 458 may be performed by, for example, the ECM 16.

In step 458, the ECM 16 generates a commanded A/F ratio while compensating for the errors associated with the error signals $O_2Err_{PRM1}$, $O_2Err_{PRM2}$, $O_2Err_{SEC1}$, $O_2Err_{SEC2}$, CatalystErr based on the other error(s) and/or fault(s) determined in step 450. For example only, the error signals $O_2Err_{PRM1}$, $O_2Err_{PRM2}$ may be generated based on an $O_2$ signal from the primary $O_2$ sensor 52. The fault detection signal FAULT may be generated for the primary $O_2$ sensor 52 based on the error signals $O_2Err_{PRM1}$, $O_2Err_{PRM2}$ and/or based on whether an error and/or fault exists with the catalytic converter 50 and the secondary $O_2$ sensor 54.

As another example, when the catalytic converter 50 has a leak (e.g., an opening to outside air that is external to the catalytic converter 50 and exhaust system 14), the secondary $O_2$ sensor 54 may indicate that exhaust gas post the catalytic converter 50 is leaner than desired. This may cause the engine control system 10 to operate in a rich state for an increased period of time, which may affect the primary $O_2$ signal Primary $O_2$. As a result, an error may be detected with the primary $O_2$ sensor 52 that is caused by a fault with the catalytic converter 50. The fault detection module 228 refrains from generating a fault detection signal that indicates that the primary $O_2$ sensor 52 is faulty in this situation based on, for example, a diagnostic trouble code that indicates a fault with the catalytic converter 50.

As yet another example, when the secondary $O_2$ sensor 54 is faulty (e.g., continuously indicating that exhaust gas downstream of the catalytic converter 50 is one of rich and lean), the engine control system 10 may operate in one of a rich state and a lean state for an increased period of time. As a result an error may be detected with the primary $O_2$ sensor 52 that is caused by a fault with the secondary $O_2$ sensor 54. The fault detection module 228 refrains from generating a fault detection signal that indicates that the primary $O_2$ sensor 52 is faulty in this situation.

Closed loop control of the ECM 16 of FIG. 1 may adjust commanded A/F ratio(s) based on and to compensate for the error and/or fault signals generated in the above-described method. For example, when one of the $O_2$ sensors 52, 54 has a fault associated with one of the error signals, the ECM 16 may accordingly adjust an amount of fuel supplied to the cylinders of the engine 12. As an example, when the secondary $O_2$ sensor 54 has an error during the second stage R2L, the ECM 16 without compensation may increase fuel flow. This may result in the primary $O_2$ sensor 52 operating in a rich state longer than in a lean state, which would result in closed loop control of the ECM 16 increasing fuel flow, decreasing air flow, and/or increasing a current A/F ratio.

To compensate for these errors, the ECM 16 may prevent an increase in fuel flow and/or decrease fuel flow. As an alternative, the ECM 16 and/or diagnostic control module 18 may adjust information received from the $O_2$ signals to account for the asymmetrical error states of the $O_2$ sensors 52, 54. This corrects the asymmetrical error states of the $O_2$ sensors 52, 54 and prevents improper operation of closed loop control.

The method may end at 460 after steps 456 and 458. The above-described steps are meant to be illustrative examples; the steps may be performed sequentially, synchronously, simultaneously, continuously, during overlapping time periods or in a different order depending upon the application.

The above-described embodiments may be used to improve fuel flow control, improve engine system performance, and reduce emissions based on the detection of asymmetrical and symmetrical states of $O_2$ sensors and associated compensation. As errors and faults with $O_2$ sensors are accounted for in the above-described embodiments, the above-described embodiments increase operating life of $O_2$ sensors and decrease false diagnostic errors and faults.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system for an engine comprising:
a stage transition module that generates a command signal based on a fuel control signal,
wherein the command signal commands a fuel system of the engine to intrusively transition between a rich state and a lean state during a diagnostic test that includes a first stage, a second stage, and a third stage, and
wherein the first, second, and third stages are defined based on transitions between the rich state and the lean state of the command signal; and
a control module that during the second and third stages detects: an error with a first oxygen sensor based on a comparison between the command signal and a first oxygen signal from the first oxygen sensor; an error with a second oxygen sensor based on a second oxygen signal from the second oxygen sensor; and an error with a catalytic converter based on the first and second oxygen signals and a manifold absolute pressure signal.

2. The diagnostic system of claim 1, wherein the first stage is followed by the second stage and the second stage is followed by the third stage,
wherein the first stage starts when the command signal commands the fuel system to intrusively transition from the lean state to the rich state and ends after a first predetermined period,
wherein the second stage starts when the command signal commands the fuel system to intrusively transition from the rich state to the lean state and ends after a second predetermined period, and
wherein the third stage starts when the command signal commands the fuel system to intrusively transition from the lean state to the rich state and ends after a third predetermined period.

3. The diagnostic system of claim 1, further comprising an oxygen detection module that detects the first oxygen signal and the second oxygen signal,
wherein the first and second oxygen signals indicate oxygen levels in an exhaust system of the engine, and
wherein the rich state is associated with an air/fuel ratio that is less than a predetermined value and the lean state is associated with the air/fuel ratio that is greater than the predetermined value.

4. The diagnostic system of claim 1, further comprising a time delay calculation module that calculates a first time delay value based on a time difference between a first rich-to-lean transition of the command signal and a second rich-to-lean transition of the first oxygen signal during the second stage,
wherein the second rich-to-lean transition sequentially follows the first rich-to-lean transition,
wherein the time delay calculation module calculates a second time delay value based on a time difference between a first lean-to-rich transition of the command signal and a second lean-to-rich transition of the first oxygen signal during the third stage, wherein the second lean-to-rich transition sequentially follows the first lean-to-rich transition, and wherein the control module detects the error with the first oxygen sensor at least one of: when the first time delay value is greater than a first predetermined threshold; and when the second time delay value is greater than a second predetermined threshold.

5. The diagnostic system of claim 1, wherein the control module detects a fault with the first oxygen sensor when the first oxygen sensor is operating in at least one of an asymmetrical error state and a symmetrical error state during the diagnostic test, wherein the asymmetrical error state is associated with the error with the first oxygen sensor detected in one of the second and third stages, and wherein the symmetrical error state is associated with the error with the first oxygen sensor detected in both the second and third stages.

6. The diagnostic system of claim 5, further comprising:
a primary signal monitoring module that monitors signal transitions of the first oxygen signal between the rich state and the lean state; and
a secondary signal monitoring module that monitors signal transitions of the second oxygen signal between the rich state and the lean state.

7. The diagnostic system of claim 6, further comprising an integrated area calculation module that calculates an integrated area of the second oxygen signal based on the signal transitions of the second oxygen signal, wherein the control module detects the error with the second oxygen sensor when the integrated area is greater than a predetermined value.

8. The diagnostic system of claim 1, further comprising a catalytic converter diagnostic module that detects the error with the catalytic converter based on an oxygen storage capacity of the catalytic converter during at least one of the second and third stages.

9. The diagnostic system of claim 1, wherein the first oxygen sensor is connected to an exhaust system between the engine and the catalytic converter and the second oxygen sensor is positioned downstream of the catalytic converter.

10. The diagnostic system of claim 1, wherein the control module:
generates a first error signal associated with the catalytic converter; and
prevents error detection of the first and second oxygen sensors based on the first error signal.

11. The diagnostic system of claim 1, wherein the control module:
generates a first error signal associated with at least one of the catalytic converter and the second oxygen sensor;
generates a second error signal associated with the first oxygen sensor; and
detects a fault state with the first oxygen sensor based on the first error signal and the second error signal.

12. The diagnostic system of claim 10, wherein the control module detects the fault state when the first error signal is in a pass state and the second error signal is in a fail state.

13. The diagnostic system of claim 11, wherein the control module detects a non-fault state with the first oxygen sensor when the first error signal is in the fail state and the second error signal is in the pass state.

14. The diagnostic system of claim 1, wherein the first and second oxygen signals periodically oscillate and iteratively cross a predetermined level, wherein the rich state is associated with portions of the first and second oxygen signals that are greater than or equal to the predetermined level, and wherein the lean state is associated with portions of the first and second oxygen signals that are less than the predetermined level.

15. A method of diagnosing an exhaust system of an engine, comprising:
generating a command signal based on a fuel control signal;
commanding a fuel system of the engine to intrusively transition between a rich state and a lean state during a diagnostic test that includes a first stage, a second stage, and a third stage;
defining the first, second, and third stages based on transitions between the rich state and the lean state of the command signal; and
detecting during the second and third stages: an error with a first oxygen sensor based on a comparison between the command signal and a first oxygen signal from the first oxygen sensor; an error with a second oxygen sensor based on a second oxygen signal from the second oxygen sensor; and an error with a catalytic converter based on the first and second oxygen signals and a manifold absolute pressure signal.

16. The method of claim 14, further comprising:
following the first stage before the second stage and following the second stage before the third stage;
starting the first stage when the command signal commands the fuel system to intrusively transition from the lean state to the rich state and ending the first stage after a first predetermined period;
starting the second stage when the command signal commands the fuel system to intrusively transition from the rich state to the lean state and ending the second stage after a second predetermined period; and
starting the third stage when the command signal commands the fuel system to intrusively transition from the lean state to the rich state and ending the third stage after a third predetermined period.

17. The method of claim 15, further comprising:
detecting the first oxygen signal and the second oxygen signal that indicate oxygen levels in the exhaust system; and
associating the rich state with an air/fuel ratio that is less than a predetermined value and associating the lean state with the air/fuel ratio that is greater than the predetermined value.

18. The method of claim 15, further comprising:
monitoring signal transitions of the first oxygen signal between the rich state and the lean state;
calculating a first time delay value based on a time difference between a first rich-to-lean transition of the command signal and a second rich-to-lean transition of the first oxygen signal during the second stage;
sequentially following the first rich-to-lean transition before the second rich-to-lean transition;
calculating a second time delay value based on a time difference between a first lean-to-rich transition of the command signal and a second lean-to-rich transition of the first oxygen signal during the third stage;
sequentially following the first lean-to-rich transition before the second lean-to-rich transition; and
detecting the error with the first oxygen sensor at least one of: when the first time delay value is greater than a first predetermined threshold; and when the second time delay value is greater than a second predetermined threshold.

19. The method of claim 15, further comprising:

detecting a fault with the first oxygen sensor when the first oxygen sensor is operating in at least one of an asymmetrical error state and a symmetrical error state during the diagnostic test;

associating the asymmetrical error state with the error with the first oxygen sensor detected in one of the second and third stages; and associating the symmetrical error state with the error with the first oxygen sensor detected in both the second and third stages.

\* \* \* \* \*